United States Patent Office 3,212,318
Patented Oct. 19, 1965

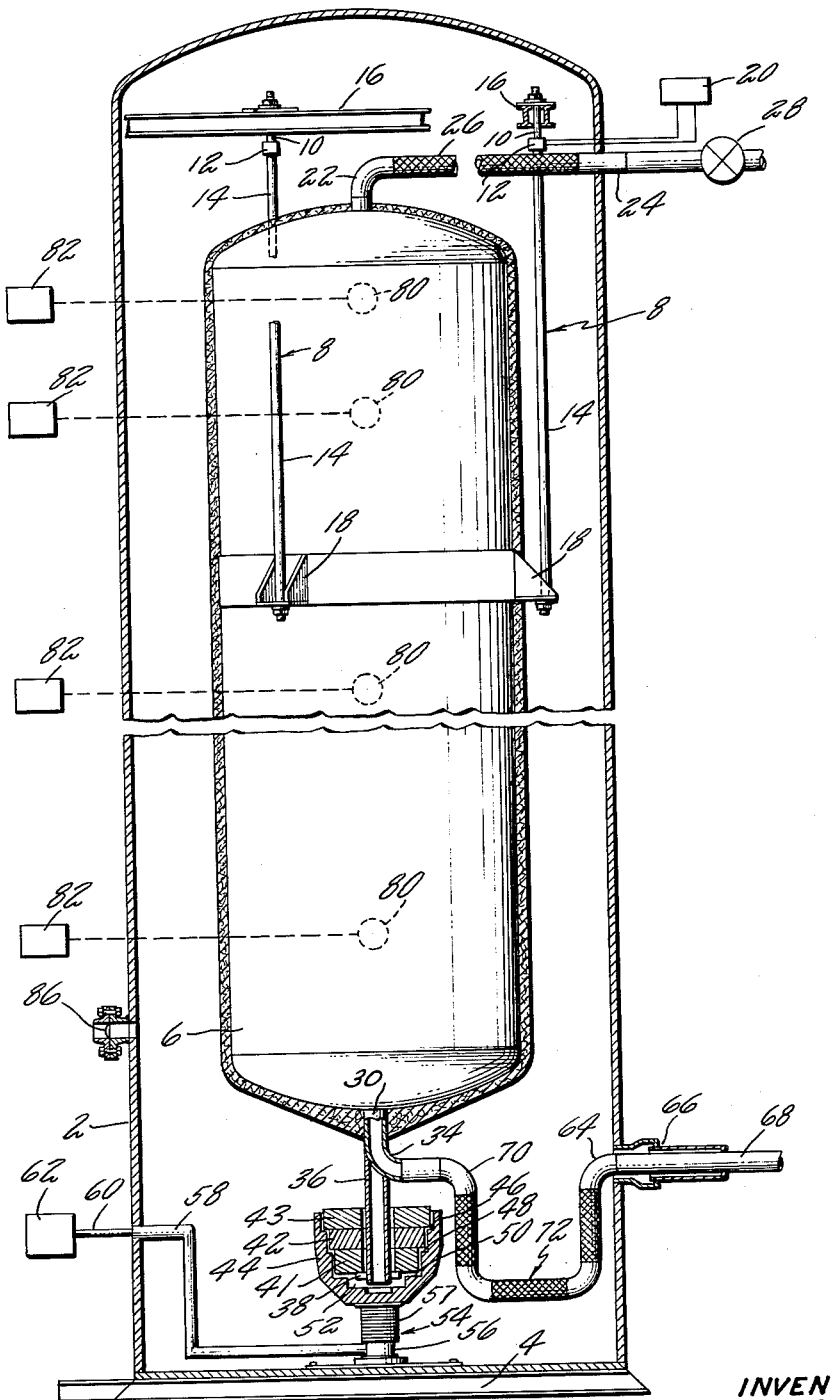

3,212,318
CALIBRATION DEVICE
Jules S. Lomax, Riviera Beach, Fla., assignor to United
Aircraft Corporation, East Hartford, Conn., a corporation of Delaware
Filed Apr. 30, 1962, Ser. No. 191,228
6 Claims. (Cl. 73—3)

This invention relates to means for measuring liquid mass flow for the calibration of liquid volumetric flowmeters, particularly for use with cryogenic liquids such as liquid hydrogen.

An object of this invention is to provide a calibration device which will record both volume and weight of a liquid which is to be used for calibration of a meter.

Another object of this invention is to provide a calibrating device having a test tank supported in an outer tank by load cells to determine the weight of liquid in the test tank being used.

Another object of this invention is to provide means for evacuating the outer tank to provide vacuum insulation for the inner tank.

A further object of this invention is to provide a calibration device having a secondary weight system which is precise and accurate to calibrate the primary weight recording portion of the mass flow measuring device.

Another object of this invention is to provide a dead weight secondary weight system which will permit frequent accuracy verification of the weight measuring portion of the mass flow device.

A further object of this invention is to make it possible to calibrate meters with a cryogenic fluid when it is this fluid which is intended for their use. An example of this cryogenic fluid is liquid hydrogen.

Another object of this invention is to provide means for lifting the weight of the test tank off of the load cells.

A further object of this invention is to provide a calibration system which is isolated from outside influence of weather and dirt.

Other objects and advantages will become apparent from a reading of the description and claims along with the drawing.

The drawing is a sectional view of the outer tank of the invention showing the inner tank suspended therein with controls shown schematically.

As seen in the drawing an outer cylindrical tank 2 is located standing on end on a base 4. A smaller inner tank 6 is suspended within said outer tank 2 by a three point suspension system. This system includes three suspension rods 8 which are located at equally spaced positions around said inner tank. Each suspension rod 8 has a short upper rod section 10 fixed to the top of a load cell 12 and a long lower rod section 14 fixed to the bottom of the same load cell.

The top of each short rod section 10 is connected to a bracket 16 which is in turn fixed to the upper part of the outer tank 2. The bottom of each long rod section 14 is connected to a bracket 18 which is in turn fixed to the outer side of inner tank 6. Brackets 18 are positioned at a point about one third the way down the height of the inner tank 6.

Each of the load cells 12 are connected to a summer 20 located externally of the outer tank at an operator's control panel. The lines extending between the load cells 12 and the summer 20 are sealed as they pass through an opening in the outer tank. The load cells 12 put out a signal which indicates the force being exerted by the weight placed thereon by the inner tank 6 and associated operating parts including tank contents. The fixed weight of the tank and associated parts can be dialed out of the summer 20 to read net weight of contents.

An evacuating device (not shown) is used to provide a vacuum within said outer tank 2 when liquids are used needing insulating. While the device should be capable of maintaining a higher vacuum in these instances a vacuum of approximately $1/1000$ cm. Hg pressure is used for normal operation to provide insulation for the inner tank. For liquids not needing insulation an inert gas can be used to provide protection for instrumentation and weights.

At the top of the inner tank 6 an elbow pipe section 22 is welded to provide an inlet for $H_2$ gas for a purpose to be hereinafter described. A straight pipe section 24 is welded to the wall of the outer tank 2. A flexible L-length of tube 26 connects the free end of the elbow section 22 and the free end of section 24 within the outer tank 2. The elbow portion of the L section is made rigid to resist straightening. While the section is shown straight with a center section broken away, this has been done to indicate that the section 24 is located in another plane from that shown in FIGURE 1.

An "on" and "off" valve 28 is provided in the pipe section 24 on the outside of said tank. The free end of the pipe section 24 located externally of the tank 2 is connected to a source of $H_2$ gas having pressure control means for placing the gas at a known pressure. The free end of the pipe section 24 is also connected to a vent line which is controlled by a valve (not shown). This vent is used to permit filling of the inner tank and for a safety relief.

A straight pipe section 30 extends downwardly from the center of the bottom of the inner tank and has an elbow 34 formed integrally therewith at its lower end. An extension rod 36 extends downwardly from said elbow section co-axially with pipe section 30 and is fixed thereto.

Three annular weights 41, 42, and 43 are slideably mounted on the rod 36 and are constructed so that the bottom weight 41 has the smallest diameter, the next adjacent weight 42 has the next largest diameter, and the top weight has the largest diameter. A flange 38 fixed to the bottom of the rod 36 prevents the weights from sliding off when unsupported by a moveable weight bucket 44.

The moveable weight bucket 44 is moveable between an intermediate upper operating position where it supports each of the weights separately on its own individual annular shoulder therein to a low operating position where all of the weights are supported on the rod 36 by the flange 38. As the bucket 44 is moved downwardly between its intermediate upper operating position and its low operating position, the weight 41 is first picked off of annular shoulder 50 of bucket 44 by the flange 38, next as the bucket is lowered further the weight 42 is picked off of annular shoulder 48 by the weight 41, and lastly as the bucket is lowered all the way, the weight 43 is picked off of annular shoulder 46 by the weight 42.

When the motion of the bucket is reversed, moving it upwardly, the weights are picked up by their respective mating annular shoulders, one at a time. The distance between shoulders 50 and 48 is greater than the height of weight 41 and the distance between shoulders 48 and 46 is greater than the height of weight 42 providing for the individual movement of each of the weights. The countersunk hole 52 is provided for a purpose to be hereinafter described.

The weight bucket 44 is mounted on a hydraulic jack or lift device which is encased by a metallic covering 54. The covering 54 consists of a bottom rigid section 56 fixed to the base of the outer tank 2 and a top flexible bellows 57 which is fixed to the bottom of the weight bucket 44 around the attachment of the jack. The bellows 57 provides for the up and down movement of the jack. The covering 54 is sealed against a leak to the interior of the outer tank 2. A conduit 58 connects the atmosphere surrounding the outer tank 2 to the interior of the covering 54 so that atmosphere surrounds the jack. A hydraulic line 60 connects an operating control 62, located outside of the outer tank 2 at an operator's control panel, to the jack for controlling it. The line 60 passes through the conduit 58, this provides atmosphere around the line 60 as it passes from the exterior of the tank 2 to the interior of the covering 54.

The control 62 will move the weight bucket above the intermediate upper operating position to an upper position where the bottom of the countersunk hole 52 abuts the bottom of rod 36 and lifts the tank to unload the load cells 12. This will provide for (1) changing the cells if necessary, and (2) for relieving strain on said cells if the device is not to be used for some extended time.

A liquid transfer passageway is provided from the free end of elbow 34 to the free end of an elbow 64 which is positioned in the wall of the tank 2. The outer free end of elbow 64 is connected to a straight section 68, both of which extend into a liner 66 which is connected to the tank 2. When tank 2 contains a vacuum this provides insulation around the elbow 64 and section 68 as they leave the tank 2. Section 68 and liner 66 form one-half of a cryogenic coupling so that an extension can be connected thereto for transferring the testing liquid to the test area.

The transfer passageway comprises an elbow 70, and a U-section 72, made up of three straight flexible sections and two elbows. One flexible section forms each side of the U and the bottom.

The flexible sections of tube are used to reduce the effect of the tank connections on the movement of the tank 6.

The inner tank 6 has liquid level sensors 80 which are located at positions wherein the volume between the actuating points of adjacent sensors 80 is known. A top sensor 80 is provided to let the operator know that the tank is full enough for a full tank run. Each sensor 80 is connected to a reading device or indicator 82 outside of the tank 2. Provided also within inner tank 6 at spaced points along its height are temperature probes to determine the temperature of the liquid within the inner tank and pressure sensors to determine the pressure within the inner tank. These are required to permit duplication of conditions that the flow meter will see in service after calibration is completed.

It can be seen that when a liquid passes from the tank 6 an operator can note the weight of the liquid when it actuates one sensor 80 and the weight of the liquid when it actuates the next adjacent sensor. Knowing the volume between sensors and knowing the loss of weight, the mass flow of the fluid is known. This known mass flow can be directed through a flow meter to calibrate the same.

In a turbine type flow meter where volumetric flow is indicated by a counter or similar device, as the known mass flow is passed through the meter the pulses or other indication of rotation of the meter can be counted or recorded and thus the pulse count or other indication for a given mass flow will be known.

At the same time the accuracy of the volumetric meter can be established by the known volume measured by the liquid level sensors within the inner tank. Since both volume accuracy and the weight of said volume of liquid flowed through the flow meter is now known, the volumetric flow meter can now be used as a mass flow meter and liquid flows through it can be read as true mass. Subsequent flows of liquid through this flow meter, when temperature and pressure of liquid are known, can be read in terms of liquid weight.

In terms of pulse count or when using a counter to record rotation of a turbine type flow meter, the counter integrates a time base automatically into the recorder count or reading of a given flow meter. A timing device can be used in conjunction with the calibrating device to establish a flow rate verses time such as gallons per minute, standard cubic feet per minute, etc. By use of a timing device, this calibrating device can be used to calibrate venturi meters, orifice meters, and other volumetric flow measuring devices both for volumetric accuracy and in terms of weight or true mass flow.

Access doors, not shown, are provided to inspect the interior of the outer tank 2 and inner tank 6. A safety blowout diaphragm 86 is provided to permit the relief of a build up of pressure in the event of a leak in the inner tank 6 when a cryogenic liquid is being used. The inner tank is insulated with a layer of fiberglass batting with foil backing. The batting is held in place by aluminum tape or other means not incorporating cements or glues. The amount of insulation is determined by that necessary to retard the boil off rate to a value which will permit the vent system to carry off the gas safely in event of loss of vacuum.

The free end of pipe section 68 is connected to the inlet of a test flow meter (not shown) and the outlet of the flow meter is connected to a receiver tank (not shown). After a test run has been made and a load cell calibration made, the liquid hydrogen can be pumped from the receiver tank back into the inner tank 6 through the pipe section 68.

To calibrate the load cells 12 the weight bracket 44 is actuated to first place weight 41 on the flange 38 connected to the inner tank 6. With the addition of this known weight 41 the load cell readout can be charted to note any error in this weight range. The other two weights 42 and 43 can be added to the weight 41, one by one with the load cell readout being charted for each of the additional weight ranges. The total weight of the three weights 41, 42 and 43 is slightly greater than the weight of a full tank of liquid. Each weight 41, 42 and 43 approximates the weight of the volume of liquid included between each adjacent sensor 80. While the tanks are shown broken away in FIGURE 1, there are four sensors spaced equally apart for test runs of three equal volumes. As stated hereinbefore the top sensor is a measurement of a full tank.

For an example, use of this device with liquid hydrogen is described below.

With the inner tank 6 cold, the tank is kept cold by containing the liquid hydrogen, and with a vacuum of approximately 1 micron pressure in the space between the outer tank 2 and the inner tank 6, the liquid hydrogen is transferred from the inner tank 6 into a receiver tank.

Each weight 41, 42 and 43 is then added to the tank 6 one at a time by lowering the weight bucket 44. The load cell readout is checked for accuracy against each addition of weight and errors noted so true weight readout can be obtained for weight of liquid hydrogen used in test.

After load cells have been calibrated the weight bucket 44 is raised to remove the weights from the flange 38 of the inner tank 6. The inner tank is then filled with liquid hydrogen through the pipe 30, with the upper vent valve opened, to the point where the upper sensor 80 is actuated.

The vent valve is closed and the $H_2$ gas valve opened and an operating pressure applied to flow the liquid hydrogen out of the inner tank 6 through pipe 30 to the flow meter to be calibrated. The liquid hydrogen flows through the meter to the receiver tank.

Weight of liquid used for test is read from the load cells and the volume of liquid is recorded from the actuation of the level sensors 80, since volume between each pair of sensors is known. Operating temperature and pressure is also recorded.

While the calibration device is being operated the flow meter count is also taken to provide a basis for calibration.

While the embodiment of the invention as herein disclosed constitutes a preferred form, it is to be understood that other forms might be adopted without departing from the scope of the invention.

I claim:
1. In combination,
 (a) a first tank,
 (b) a second tank,
 (c) means mechanically suspending said second tank entirely within said first tank,
 (d) said mechanical suspending means including load detecting means for detecting any weight added to or taken away from said second tank,
 (e) first indicating means for indicating the weight detected by said load detecting means,
 (f) conduit means for placing a liquid in said second tank,
 (g) said second tank being sealed from said first tank,
 (h) conduit means for removing liquid from said second tank,
 (i) sensing means for sensing a given volume of liquid flowing from said second tank,
 (j) second indicating means actuated by said sensing means for indicating a given volume of liquid flowing from said second tank, and
 (k) said sensing means comprising at least two sensing units spaced one above the other so that the volume between said units is known.

2. In combination,
 (a) a first tank,
 (b) a second tank,
 (c) means mechanically suspending said second tank entirely within said first tank,
 (d) said mechanical suspending means including load detecting means for detecting any weight added to or taken away from said second tank,
 (e) first indicating means for indicating the weight detected by said load detecting means,
 (f) conduit means for placing a liquid in said second tank,
 (g) said second tank being sealed from said first tank,
 (h) conduit means for removing liquid from said second tank,
 (i) sensing means for sensing a given volume of liquid flowing from said second tank,
 (j) second indicating means actuated by said sensing means for indicating a given volume of liquid flowing from said second tank,
 (k) said sensing means comprising at least two sensing units spaced one above the other so that the volume between said units is known, and
 (l) means for adding a known test weight to said second tank to calibrate said load detecting means.

3. In combination,
 (a) a first tank,
 (b) a second tank,
 (c) means mechanically suspending said second tank entirely within said first tank,
 (d) said mechanical suspending means including load detecting means for detecting any weight added to or taken away from said second tank,
 (e) first indicating means for indicating the weight detected by said load detecting means,
 (f) conduit means for placing a liquid in said second tank,
 (g) said second tank being sealed from said first tank,
 (h) conduit means for removing liquid from said second tank,
 (i) sensing means for sensing a given volume of liquid flowing from said second tank,
 (j) second indicating means actuated by said sensing means for indicating a given volume of liquid flowing from said second tank,
 (k) said sensing means comprising at least two sensing units spaced one above the other so that the volume between said units is known,
 (l) means for adding a known test weight to said second tank to calibrate said load detecting means, and
 (m) said last-named means being capable of supporting the second tank to relieve the load on the load detecting means.

4. In combination,
 (a) a first tank,
 (b) a second tank for containing cryogenic liquids,
 (c) means mechanically suspending said second tank entirely within said first tank,
 (d) said mechanical suspending means including load detecting means for detecting any weight added to or taken away from said second tank,
 (e) first indicating means for indicating the weight detected by said load detecting means,
 (f) conduit means for placing a liquid in said second tank,
 (g) said second tank being sealed from said first tank,
 (h) conduit means for removing liquid from said second tank,
 (i) sensing means for sensing a given volume of liquid flowing from said second tank,
 (j) second indicating means actuated by said sensing means for indicating a given volume of liquid flowing from said second tank, and
 (k) insulating means between said first and second tanks.

5. In combination,
 (a) a first tank,
 (b) a second tank for containing cryogenic liquids,
 (c) means mechanically suspending said second tank entirely within said first tank,
 (d) said mechanical suspending means including load detecting means for detecting any weight added to or taken away from said second tank,
 (e) first indicating means for indicating the weight detected by said load detecting means,
 (f) conduit means for placing a liquid in said second tank,
 (g) said second tank being sealed from said first tank,
 (h) conduit means for removing liquid from said second tank,
 (i) sensing means for sensing a given volume of liquid flowing from said second tank,
 (j) second indicating means actuated by said sensing means for indicating a given volume of liquid flowing from said second tank,
 (k) insulating means between said first and second tanks, and
 (l) the area between said first tank and second tank being evacuated to provide a vacuum.

6. In combination,
 (a) a first tank,
 (b) a second tank,
 (c) means mechanically suspending said second tank entirely within said first tank, (d) said mechanical suspending means including load detecting means for detecting any weight added to or taken away from said second tank,
(e) first indicating means for indicating the weight detected by said load detecting means,
(f) said second tank being sealed from said first tank,
(g) conduit means for placing a liquid in and for removing liquid from said second tank,
(h) means for venting said second tank when it is being filled,
(i) means for pressurizing said second tank to remove liquid therefrom,
(j) sensing means for sensing a given volume of liquid flowing from said second tank, and
(k) second indicating means actuated by said sensing means for indicating a given volume of liquid flowing from said second tank.

UNITED STATES PATENTS
References Cited by the Examiner

| | | | |
|---|---|---|---|
| 1,215,533 | 2/17 | Hoppes | 73—296 X |
| 3,034,331 | 5/62 | Brueckner | 73—3 |
| 3,068,683 | 12/62 | Petterson et al. | 73—3 |

ISAAC LISANN, *Primary Examiner.*